(12) United States Patent
Arethens

(10) Patent No.: US 6,191,729 B1
(45) Date of Patent: Feb. 20, 2001

(54) SATELLITE SIGNAL RECEIVER WITH INTEGRITY CONTROL AND EXCLUSION OF DEFECTIVE AXES

(75) Inventor: Jean-Pierre Arethens, Beaumont les Valence (FR)

(73) Assignee: Sextant Avionique, Velizy Villacoublay (FR)

(*) Notice: Under 35 U.S.C. 154(b), the term of this patent shall be extended for 0 days.

(21) Appl. No.: 09/147,359
(22) PCT Filed: Jun. 3, 1997
(86) PCT No.: PCT/FR97/00967
 § 371 Date: Dec. 7, 1998
 § 102(e) Date: Dec. 7, 1998
(87) PCT Pub. No.: WO97/47984
 PCT Pub. Date: Dec. 18, 1997

(30) Foreign Application Priority Data

Jun. 7, 1996 (FR) .................................................. 96 07073

(51) Int. Cl.[7] .............................. G01S 5/02; H04B 7/185
(52) U.S. Cl. ......................................................... 342/357.02
(58) Field of Search .......................... 342/357.02, 357.06

(56) References Cited

U.S. PATENT DOCUMENTS 5,202,829 * 4/1993 Geier ..................................... 701/215
5,436,632 * 7/1995 Sheynblat ........................ 342/357.03
5,504,492 * 4/1996 Class et al. ...................... 342/357.06

OTHER PUBLICATIONS

Lee, Y.C., "Receiver autonomous integrity monitoring (RAIM) capability for sole–means GPS navigation in the oceanic phase of flight", Position Location and Navigation Symposium, 1992. Record: 500 Years After Columbus—Navigation Challenges of Tomorrow, IEEE Plans '92, IEEE, 1992, p. 464–472.*

International Search Report for PCT/FR97/00967, Aug. 1997.*

* cited by examiner

Primary Examiner—Thomas H. Tarcza
Assistant Examiner—Fred H. Mull
(74) Attorney, Agent, or Firm—Oblon, Spivak, McClelland, Maier & Neustadt, P.C.

(57) ABSTRACT

A satellite positioning receiver with integrity check and exclusion of defective axes. In order to improve the reliability of the measurements which are divergent with respect to the measurements provided by the other satellites in the constellation which is used at a given time. The invention proposes a solution for more rapidly recalculating the position by eliminating the data from a defective satellite: the means for calculating the position vector X on the basis of n satellites include an iteration process with n steps, the $j^{th}$ step involving the $j^{th}$ satellite; a position X' is recalculated using only n−1 satellites on the basis of the n steps already calculated, by adding an $(n+1)^{th}$ iteration step, using the measurements from the defective satellite of rank m, this last step being slightly different from the previous ones and the difference being such that the calculation result after this $(n+1)^{th}$ step is identical to that which an iteration with n−1 steps excluding the divergent satellite of rank m would give.

9 Claims, 2 Drawing Sheets

SATELLITE SIGNAL RECEIVER WITH INTEGRITY CONTROL AND EXCLUSION OF DEFECTIVE AXES

BACKGROUND OF THE INVENTION

1. Field of the Invention

The invention relates to satellite positioning receivers such as GPS (Global Positioning System) receivers.

2. Discussion of the Background

The GPS system uses a constellation of satellites which move around the earth on very precisely determined orbits, that is to say it is possible to know the position of an arbitrary satellite at any time. The satellites transmit radiofrequency signals, containing navigation data and codes which make it possible to identify each satellite. These codes phase modulate a carrier frequency. A GPS receiver, on the ground or on a land, air or sea vehicle, can receive the signals from several satellites simultaneously, precisely calculate its distance from each of the satellites, and deduce therefrom its precise position in latitude, longitude and altitude in a terrestrial frame. It can also deduce therefrom the precise date and time of the reception in the time frame of the GPS system. It can lastly deduce therefrom, by Doppler measurements, its own velocity vector in the terrestrial frame (the case of a receiver mounted on a moving vehicle).

In the GPS system, each satellite is identified by a pseudo-random code which is individual to it and repetitively (for example every millisecond) modulates a carrier frequency which the satellite transmits. There are systems similar to GPS, in particular the GLONASS system, in which this pseudo-random code also exists even though it is not used to identify individual satellites. The invention which will be described is directly applicable to the GLONASS system, but for the sake of simplicity reference will be made below only to the GPS system, and more precisely the "civil" part of the GPS system which also has a military part to which the invention is equally applicable.

The pseudo-random code is a long code (1023 bits at 1.023 MHz, i.e. 1 millisecond), and one of its main functions is to make it possible to extract the satellite's signal from a noise level much higher (for example 30 dB) than the level of the signal. This technique is now widely known as spread spectrum transmission. The signal is extracted from the noise using an operation, in the receiver, of correlation between the received signal and a periodic pseudo-random code which is identical to the one expected to be found in the signal. If the codes do not coincide temporally, there is no correlation between the received signals and the local code generated by a local code generator; if they almost coincide, there is some degree of correlation, the correlation energy becoming stronger as the coincidence becomes more exact. It is therefore possible to establish a correlation signal making it possible to slave a local code generator until exact coincidence is obtained between the local code and the code modulating the signal which the satellite transmits. A code slaving loop then makes it possible to maintain this coincidence.

The pseudo-random code is transmitted by the satellite at extremely precise times which are known at the receiver. Use is made of the correlation operation to determine the arrival time of this code in the receiver: the characteristic time or epoch of transmission of the local code is determined, and since this local code coincides with the received code when the maximum correlation is established, this time represents the arrival time of the received code. The difference between a time at which the code is transmitted via the satellite and a time at which the code is received by the receiver makes it possible to determine a propagation time of the signals between the satellite and the receiver. Knowing that the propagation velocity of the signals is the velocity of light, the distance between the receiver and a given satellite can be calculated. The same operation performed on two other satellites makes it possible, by triangulation, to determine the exact position of the receiver relative to the three satellites.

By using a fourth satellite, the clock errors of the receiver are eliminated, the clock of the receiver not being as precise as that of the satellites. Further to the position of the receiver, it is then possible to calculate a precise time for the position measurement, in the time frame of the GPS satellites.

The position of each of the satellites is known at any time: it is calculated on the basis of tables which are stored in the receiver and are updated by the navigation message broadcast by the satellites. The velocity of the satellites at any time can also be calculated on the basis of these tables.

It is possible to determine, on the basis of the signals sent by four satellites, the time and the position of the receiver relative to the four satellites. Furthermore, by changing co-ordinates, the position of the receiver in a fixed terrestrial frame is obtained, since the position of the satellites at any time is known. The same is true as regard velocity.

However, if more than four satellites are used, redundant information is obtained. This is the case for the professional-quality receivers used, for example, in aeronautics.

If using all the redundant information led exactly to the same velocity calculation results, it would be possible to make do with taking any four satellites from the satellites in the constellation observed at a given time.

However, the measurements are affected by various imprecisions, so that the redundancy is not perfect. Furthermore, a satellite may be operating defectively at a given time and therefore give aberrant information interfering with the position and velocity determinations.

This is why systems have been conceived making it possible to determine the measurement integrity for the position, that is to say to check how good the agreement is between the measurements taken on all the satellites. If the agreement is not good, that is to say if the measurements taken with n satellites do not all project correctly onto a single point in the terrestrial frame, it has also been proposed to find out whether there is one particular satellite which is disrupting the measurement, and it has been proposed to suspend inclusion of this satellite so long as it interferes with the measurement.

One way of measuring the divergence between the measurements delivered by n satellites consists in calculating, by a least squares method, a "distance" in n-dimensional space between, on the one hand, the individual measurements delivered on the basis of each satellite and, on the other hand, a mean point in the four-dimensional terrestrial space (space and time) representing the most probable position of the receiver in view of the n measurements. This search may also be made for a measurement of the receiver's velocity.

The standard deviation between these various distances constitutes an estimated value of divergence between the measurements, and this estimated value may be compared with a threshold: if it is excessive, the measurement may be considered to be tainted with a fault. It may then be desirable to look for and eliminate the satellite or satellites which are the most probable origin of this fault.

To do this, a search may be made, by comparing the n "distances" between one individual measurement and the means point which is found, as to what is the greatest distance and therefore which satellite is the most likely origin of the measurement fault. This satellite may then be eliminated, which means that a new position or a new velocity must then be provided with the measurements from the remaining n−1 satellites.

However, determination of this satellite which is to be excluded requires many time-consuming calculations. These calculations involve n-dimensional matrix calculations, and matrix inversions in these calculations. They have to be repeated several times if several satellites need to be eliminated. However, the receiver has to function in real time and regularly deliver a new position and a new velocity, for example every second or even more frequently. The consequence of this is that, in order to successfully verify the position or velocity integrity and eliminate the defective satellites, far too much computing power and speed would be necessary, leading to a high cost of the receiver.

SUMMARY OF THE INVENTION

The object of the present invention is to provide a receiver having means which are more suitable for rapidly delivering measurement results eliminating the defective satellite or satellites.

The invention therefore proposes a satellite positioning receiver, comprising measurement means which simultaneously use n satellites of rank j=1 to n and deliver an n-dimensional measurement vector Z representing the measurements along the n director axes joining the receiver to the n satellites, means for calculating a four-dimensional state vector X on the basis of the measurement vector Z, means for determining the degree of divergence between the n measurements, means for identifying a satellite of rank m which is the most probable cause of excessive divergence, and means for determining a new state vector X' on the basis of a vector Z' of n−1 measurements excluding the measurement coming from the divergent satellite of rank m, characterized in that the means for calculating the vector X include an iteration process with n steps, the $j^{th}$ step involving the $j^{th}$ satellite, and in that the means for determining the vector X' include an $(n+1)^{th}$ iteration step, using the measurements from the divergent satellite of rank m, this last step being slightly different from the previous ones and the difference being such that the calculation result after this $(n+1)^{th}$ step is identical to that which an iteration with n−1 steps excluding the divergent satellite of rank m would give.

First, instead of performing iterative calculations giving the vector X then, after detecting an excessive divergence, repeating the iterative calculations while excluding the defective satellite, it has been found possible merely to perform an extra iteration step, with a slightly different calculation formula, in order to achieve the desired result.

More precisely, if:

$Z_j$ denotes the component of rank j of the measurement vector $X_j$ denotes the estimate of the measurement vector at step j of the iteration, $P_j$ denotes a matrix of 4×4 coefficients at step j, $K_j$ denotes a 4×1 gain vector at step j, $\sigma_j$ denotes the component of estimated noise for the measurement on the axis j, H denotes the n×4 matrix of the director cosines of the n satellites, $(H)^{<j>}$ denotes the $j^{th}$ row of this matrix, and $(H)^{<j>T}$ denotes the transpose of this $j^{th}$ row, the iteration formula is as follows:

$K_j = P_{j-1}.(H)^{<j>T}.[(\sigma_j^2)+(H)^{<j>}.P_{j-1}.(H)^{<j>T}]^{-1}$ $P_j = P_{j-1} - K_j.(H)^{<j>}.P_{j-1}$ $X_j = X_{j-1} + K_j.[Z_j - (H)^{<j>}.X_{j-1}]$ and the $(n+1)^{th}$ step of the iteration is obtained by calculating the gain by the formula:

$K_{n+1} = P_n.(H)^{<m>T}.[\sigma_m^2 + H^{<m>}.P_n.(H)^{<m>T}]^{-1}$, and the state vector X' by the formula:

$X' = X_n + K_{n+1}.[Z_m - (H)^{<m>}.X_n]$

Implementing these calculations is much faster than a full new iterative calculation with n−1 steps, so that after having calculated the vector X and after having looked for which axis most probably lacks integrity, a state vector X' can be rapidly recalculated while not including the axis which lacks integrity.

The determination of the axis which lacks integrity, corresponding to a satellite of rank m, is preferably carried out in the following way: a residue $\Delta X = (|Z - H.X|)^2$ for n different configurations with n−1 satellites each is calculated, each configuration corresponding to the exclusion of a determined satellite, the residue is in each case compared with a threshold, and a satellite of rank m is identified, if it exists, such that the residue is greater than the threshold for all the configurations in which this satellite is present and less than the threshold for the configuration in which it is absent.

Other identification methods are possible, in which a contribution of each satellite to the measurement error is instead evaluated and the satellite of rank m which gives the highest contribution is determined. The contribution of the satellite of rank i is preferably calculated on the basis of the formula $\Delta X_i = Z_i - (H)^{<i>}.X$, but it is preferably divided by the relative sensitivity $S_{i,i}$ on the axis i; this sensitivity is the coefficient of rank i, i of the n×n matrix $S = I - S = I - H(H^T - H)^{-1} H^T$ where I is the n×n identity matrix.

DETAILED DESCRIPTION OF THE PREFERRED EMBODIMENTS

Other characteristics and advantages of the invention will become apparent on reading the following detailed description which is given with reference to the appended drawings, in which.

DETAILED DESCRIPTION OF THE PREFERRED EMBODIMENTS

Figure 1:
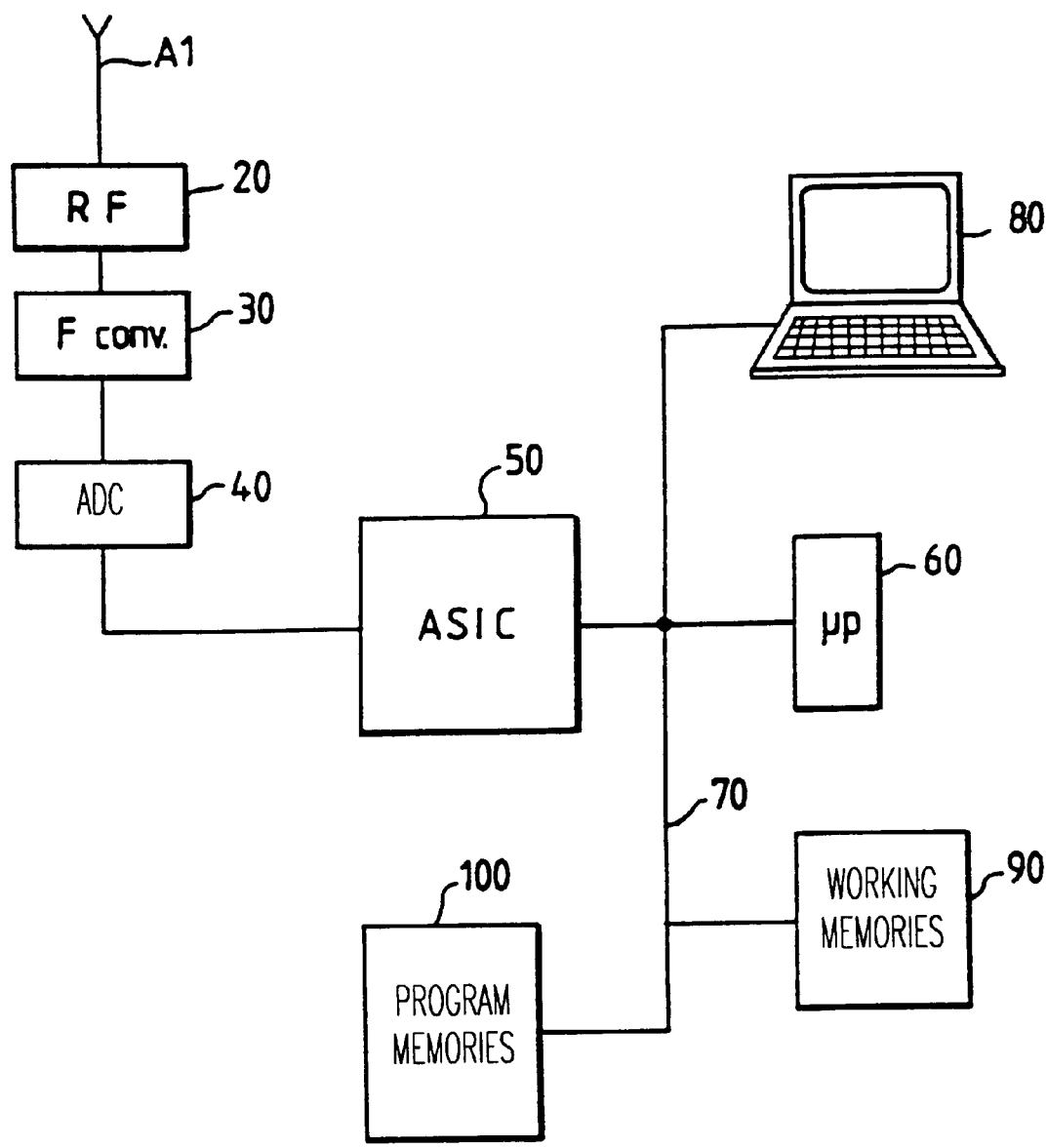
FIG. 1 represents the overall structure of a GPS receiver in which the present invention may be implemented.

FIG. 1 gives a brief overview of the general principle of a GPS receiver. The receiver has a radiofrequency part, comprising an antenna A1, a radiofrequency amplifier 20 and various associated filtering circuits, frequency conversion circuits 30 and an analog to digital converter 40. The converter makes it possible to deliver relatively low-frequency digital signals intended to be processed in a digital signal processing circuit 50. This circuit is controlled by a microprocessor 60 and associated calculation and control software.

The microprocessor 60 has two functions:

on the one hand, it works out digital data used by the digital signal processing circuit 50, on the basis of digital data delivered by this circuit; in particular, it performs numerical calculations necessary for the digital slaving loops present in the digital processing circuit 50;

and on the other hand it gives final results of position, time and velocity calculation to the user, that is to say either on a digital display screen or on a digital bus to other equipment which need the results.

It could clearly be possible to have two separate processors for performing these two functions. In the embodiment with a single microprocessor 60, a bus 70 has been represented for exchanges between the microprocessor 60, the processing circuit 50, an input/output peripheral 80, the working memories 90, and the program memories 100 which contain the programs needed for the microprocessor to function.

Very briefly, the digital signal processing circuit has either a single processing channel, with the information from the various satellites being multiplex-processed, or preferably several channels which each work in parallel on a determined satellite.

Each channel has a double slaving loop: carrier phase slaving and code phase slaving.

The carrier phase loop essentially uses a local oscillator with digital phase control, delivering a periodic (sawtooth) digital phase at a frequency corresponding to the transposed carrier frequency, taking into account the Doppler effect to which the carrier frequency broadcasted by a satellite is subjected. The Doppler effect is taken into account by the very fact of the existence of the slaving loops. The microprocessor 60 calculates a carrier phase error signal; this signal is used to control the local oscillator in order to slave a local carrier frequency to the carrier frequency received from the satellite.

The code phase slaving loop has a local code generator driven by an oscillator with digital phase control. It makes it possible to slave the local codes to the code received from the satellite and then to be able to determine the exact temporal position of the local codes thus slaved. The local code is correlated with the code received from the satellite; the correlation signal is calculated by the microprocessor and is used to slave the loop in order to bring the local code into synchrony with the code received from the satellite.

The two slaving loops, for code and carrier, take into account the Doppler frequency shift on the carrier frequency and on the code, which result from the relative motion of the aircraft and the detected satellite. This Doppler shift can be measured in the loops.

The GPS time and position calculations are performed on the basis of the status of the slaving loops at a determined measurement time. At this time, the exact status of the phase of the two oscillators with digital phase control are read.

The slaving loops provided in the receiver act to lock a local frequency onto the carrier frequency received from the satellites. The shift between this local frequency and the stable and known frequency transmitted by the satellites gives an indication of Doppler shift and therefore the difference between the velocity of the satellite and the velocity of the receiver along the axis joining the satellite to the receiver. As will be seen below, this Doppler indication needs to be corrected for the local clock frequency error of the receiver, which error can be measured by the temporal drift of the local clock relative to the GPS time determined at several successive instants.

The receiver therefore calculates, for the n different satellites observed at a given time (n grater than or equal to 4), its relative position with respect to these satellites. It deduces therefrom the directions of the observation axes of each of the satellites. Furthermore, by a change of axes, it also deduces therefrom its position in a four-dimensional terrestrial frame (longitude, latitude, altitude, time).

In the same way, the receiver may calculate its velocity along the n satellite axes and deduce therefrom its velocity in a four-dimensional terrestrial frame.

However, given that only four satellites are necessary for determining a position or a velocity, whereas the measurement is taken on n satellites with n>4, there is redundant information. If the measurements are subject to errors (measurement noise on each axis), the coincidence between the various measurements will not be perfect. This means that, if one group of 4 satellites is chosen form the n, the coordinate change will lead to one position and one velocity vector in the terrestrial frame, but if another group of 4 satellites is chosen, this will lead to a slightly different position and a slightly different velocity vector.

The receiver therefore calculates, for example using a least squares method, the most probable position and velocity resulting from use of the n satellites. This method will be returned to in more detail. Furthermore, the receiver may also calculate an estimate of the error resulting from use of the n satellites, that is to say an estimate of the divergence between the n measurements. It may determine whether this divergence exceeds an acceptable threshold, and conclude therefrom that the measurement should be rejected because of this excess. Lastly, it may calculate an estimate of the measurement error coming from a particular satellite, perform classification of the errors generated by the various satellites, determine which satellite is at risk of causing an unacceptable divergence, eliminate the measurements provided on the basis of this satellite, and give a corrected position or velocity on the basis of the n−1 remaining satellites. The receiver may also resume satellite elimination if the error with n−1 satellites continues to exceed an acceptable threshold.

Figure 2:
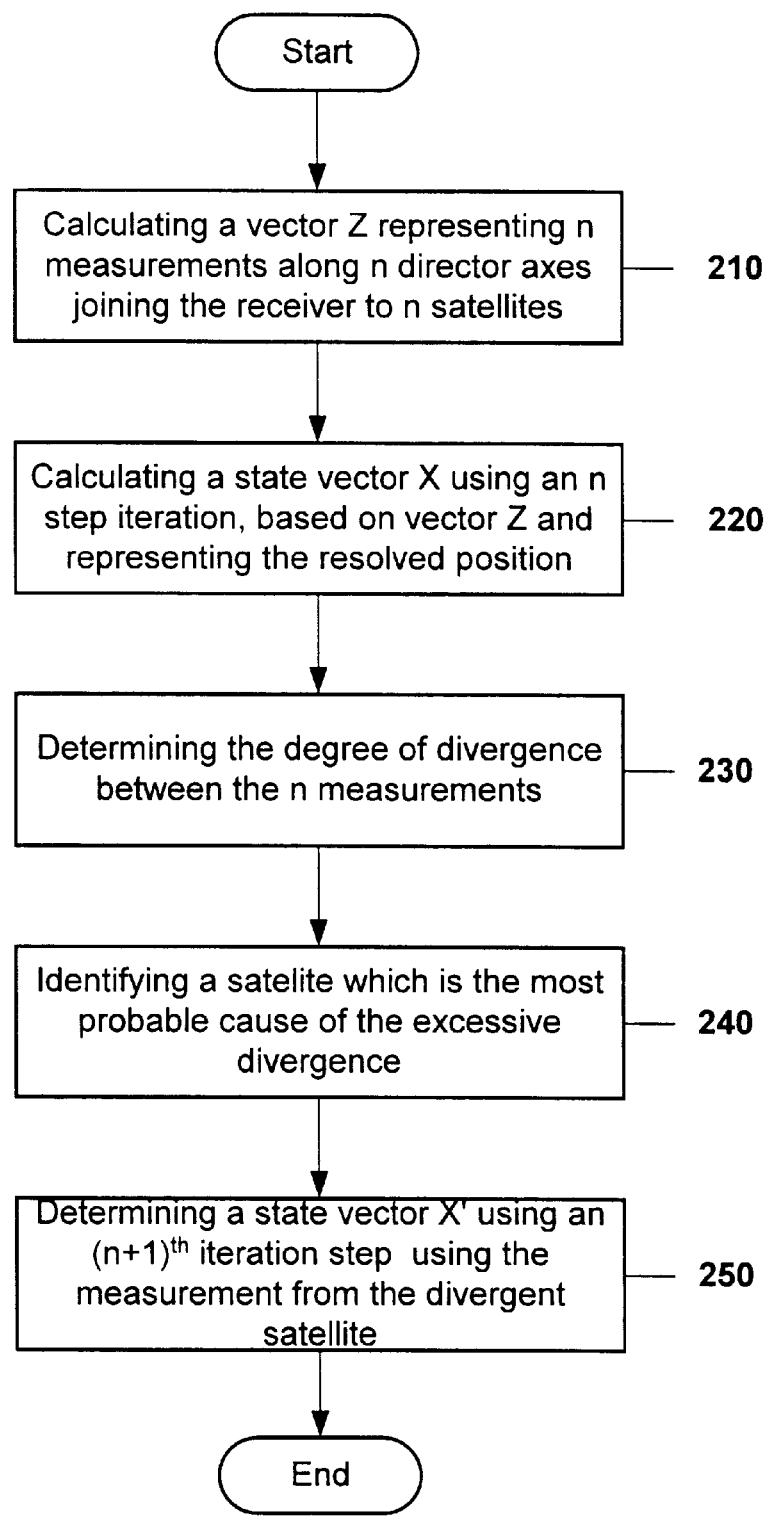
FIG. 2 shows a flow chart illustrating the method according to the present invention.

The object of the invention is to propose a rapid solution for delivering a corrected position or velocity on the basis of n−1 satellites when an unacceptable divergence has been detected, and when the satellite which is the probable origin of this divergence has been identified. This solution will be explained in detail and is illustrated as steps 210–250 of FIG. 2.

It will be assumed for simplicity below that the desired measurement is a measurement of the receiver's position, but the principle may be readily adapted if it is the receiver's velocity which is to be measured.

Z will denote the n-dimensional vector representing the n relative position measurements taken along the n director axes joining the receiver to the satellites. In this vector, the component $Z_j$ is the position measurement of the director axis corresponding to the $j^{th}$ satellite.

H is the n×4 matrix of the director cosines, that is to say a matrix with n rows of four coefficients $C_{i,x}$, $C_{i,y}$, $C_{i,z}$, 1 (i=1 to n), where $C_{i,x}$, $C_{i,y}$ and $C_{i,z}$ represent the cosines of the angles between the $i^{th}$ director axis and the axes Ox, Oy, Oz (longitude, latitude, altitude) of the terrestrial frame (O being the position of the receiver). The matrix $H^T$ is the transpose matrix of H. The vector $(H)^{<j>}$ represents the $j^{th}$ row of the matrix H, and the vector $(H)^{<j>T}$ is the transpose of this $j^{th}$ row.

The absolute position of the receiver in the terrestrial frame can be expressed in the form of a vector X, which will be referred to as the state vector, as opposed to the measurement vector Z. The vector Z is an n-dimensional vector; the vector X is a four-dimensional vector representing the desired position, also referred to as the "resolved position".

If there were no measurement error, that is to say if there were coincidence for the value of the vector X calculated by including an arbitrary group of 4 satellites from the n, there would be the following relationship between the vector X and the vector Z:

$$Z=H.X \quad (1)$$

This means that the measurements of the receiver's velocity along the director axes (which are considered as a fixed frame) can be projected into the four-dimensional terrestrial frame to obtain a four-dimensional velocity vector uniquely.

In reality, there is a discrepancy between Z and H.X, and the integrity of the position measurement by more than four satellites can be represented by a measurement of this discrepancy between Z and H.X.

If an optimization criteria is picked for finding the vector X which is most representative of the desired position in the terrestrial frame, X can be calculated on the basis of the formula Z=H.X. This criterion is preferably a criterion of minimizing the sum of the distances between the position found (X), projected onto the director axes, and the measured position ($Z_j$) along these axes.

Mathematically, if this criterion is adopted, which is equivalent to minimizing the norm of the vector Z–H.X, it can be shown that the equation Z=H.X admits the following solution:

$$X=(H^T.H)^{-1}.H^T.Z \quad (2)$$

Furthermore, the measurement of the overall measurement error can be evaluated quantitatively on the basis of the following value $\Delta V$, which will be referred to as "residue of the calculation error":

$$\Delta X = (|Z-H.X|)^2 \quad (3)$$

which is to say that the residue $\Delta X$ is the normalized value of the difference vector between the measured vector Z and the vector H.X.

This residue $\Delta X$ becomes greater as the measurements taken by the n satellites coincide less well. It is calculated by the processor on the basis of formula (3) and, if it exceeds a determined threshold, an unacceptable measurement indication may be broadcast. In the present case, if the threshold is exceeded, a process is furthermore initiated for recalculating the position while excluding the satellite or satellites which are the probable cause of an excessive error.

In order to achieve this result, the processor calculates the residue for n sets of n−1 satellites, that is to say that each time it suppresses a determined satellite from the constellation before calculating the residue.

The contributions of each satellite are the values $\Delta X_i$ for the satellite of rank i, with:

$$\Delta X_i = Z_i - (H)^{<i>}.X \quad (4)$$

They are calculated on the basis of the vector X determined beforehand.

If the calculated residues are all less than a predetermined threshold, it is considered that there is no problem and the measurement is correct with n satellites. If several residues are less than the threshold, it is considered that there is an error, but there is no way of determining where it comes from, and the measurement is not used (a wait is made for the next measurement before taking a decision). If, lastly, all the residues but one are greater than the threshold, then the satellite which has introduced an error is known, since the error disappears when it is eliminated, and an attempt is therefore made to eliminate it in order to calculate the position X.

The elimination consists in recalculating the vector X, but this time only using n−1 satellites (satellite m excluded), even though it was calculated beforehand with n satellites.

Furthermore, to accelerate the recalculation of a vector X' which is intended to replace the vector X previously calculated, it is proposed according to the invention that:

1. The first calculation of the vector X be made by an iterative method and not a matrix inversion method (which results from equation (2)); and
2. The calculation of the vector X' is carried out on the basis of the iterative calculation of X by adding an extra iteration step which uses the measurements from the satellite of rank m to be eliminated and is modified with respect to the other steps in such a way that the vector X' resulting from this extra iteration step is identical to the vector which would have been obtained by an iterative calculation not including the satellite of rank m.

More precisely, when the intention is to find the vector X satisfying equation (1) with optimization by the least squares method (minimizing the distances as explained above), X can be found by the following iteration method, including three calculations at an arbitrary iteration step of rank j, where j varies from 1 to n, that is to say where j represents a particular director axis:

A. Calculation of a gain $K_j$, with:

$$K_j = P_{j-1}.(H)^{<j>T}.[(\sigma_j^2)+(H)^{<j>}.P_{j-1}.(H)^{<j>T}]^{-1}$$

$P_j$ is a matrix of coefficients which are calculated at step j; $P_{j-1}$ is therefore this matrix at the preceding step.

$\sigma_j^2$ is a component of estimated noise for the measurement along the axis j. This noise is a datum known a priori, or estimated a priori, resulting principally, from the "selective availability" (SA) error which is a clock imprecision affecting the satellites, the amplitude of which imprecision is given by the satellites themselves in the navigation message, atmospheric propagation errors, correlation noise, estimated in the receiver by a filter which gives this noise directly.

The matrix $P_0$ is initially a diagonal matrix with high coefficients (for example $10^5$).

B. Calculation of the matrix $P_j$ with:

$$P_j = P_{j-1} - K_j.(H)^{<j>}.P_{j-1}$$

C. Calculation of a position estimate $X_j$, with:

$$X_j = X_{j-1} + K_{j-1}.[Z_j - (H)^{<j>}.X_{j-1}]$$

where $X_j$ is the four-dimensional state vector estimated at step j of the iteration, and $Z_j$ is the component of rank j in the position measurement vector, that is to say the measurement along the director axis j.

Having obtained a final estimate $X=X_n$ of the state vector at the end of the iteration, it is proposed to calculate the state vector X' (over n−1 satellites, axis m excluded) by an extra but slightly modified iteration step:

$$K_{n+1} = P_n.(H)^{<m>T}.[-(\sigma_m)^2 + (H)^{<m>}.P_n(H)^{<m>T}]^{-1}$$

and $X' = X_n + K_{n+1}.[Z_m - (H)^{<m>}.X_n]$

This last calculation gives a state vector value X' (position or velocity in a four-dimensional terrestrial frame) representing the contribution of the satellites other than the excluded satellite of rank m.

At this stage, it is clearly possible to verify that there is no longer measurement divergence (calculation of the residue $\Delta V$).

These calculations are performed at each new position or velocity measurement, and if the satellite of rank m no longer induces a measurement divergence, it is reintegrated into the position or velocity calculation. The decision criterion is the fact that eliminating the satellite of rank m causes a return of the residue below the threshold, even though the residue is greater than the threshold each time the satellite of rank m is present.

What is claimed is:

1. Satellite positioning receiver, comprising measurement means which simultaneously use n satellites of rank j=1 to n and deliver an n-dimensional measurement vector Z representing the measurements along the n director axes joining the receiver to the n satellites, means for calculating a four-dimensional state vector X on the basis of the measurement vector Z, means for determining the degree of divergence between the n measurements, means for identifying a satellite of rank m which is the most probable cause of excessive divergence, and means for determining a new state vector X' on the basis of a vector Z' of n−1 measurements excluding the measurement coming from the divergent satellite of rank m, characterized in that the means for calculating the vector X include means for performing an iteration process with n steps, the $j^{th}$ step involving the $j^{th}$ satellite, and in that the means for determining the vector X' include means for performing an $(n+1)^{th}$ iteration step, using the measurements from the divergent satellite of rank m, this last step being different from the previous ones and the difference being such that the calculation result after this $(n+1)^{th}$ step is identical to that which an iteration with n−1 steps excluding the divergent satellite of rank m would give.

2. Receiver according to claim 1, characterized in that, if:

$Z_j$ denotes the component of rank j of the measurement vector $X_j$ denotes the estimate of the measurement vector at step j of the iteration, $P_j$ denotes a matrix of coefficients at step j, $K_j$ denotes a 4×1 gain vector at step j, $s_j$ denotes the component of estimated noise for the measurement on the axis j, H denotes the n×4 matrix of the director cosines of the n satellites, $(H)^{<j>}$ denotes the $j^{th}$ row of this matrix, and $(H)^{<j>T}$ denotes the transpose of this $j^{th}$ row, the iteration formula is as follows:

$K_j = P_{j-1} \cdot (H)^{<j>T} \cdot [(s_j^2) + (H)^{<j>} \cdot P_{j-1} \cdot (H)^{<j>T}]^{-1}$ $P_j = P_{j-1} - K_j \cdot (H)^{<j>} \cdot P_{j-1}$ $X_j = X_{j-1} + K_j \cdot [Z_j - (H)^{<j>} \cdot X_{j-1}]$ and the $(n+1)^{th}$ step of the iteration is obtained by calculating, on the one hand, the gain vector by the formula:

$K_{n+1} = P_n \cdot (H)^{<m>T} \cdot [-s_m^2 + H^{<m>} \cdot P_n \cdot (H)^{<m>T}]^{-1}$, and, on the other hand, the state vector X' by the formula:

$X' = X_n + K_{n+1} \cdot [Z_m - (H)^{<m>} \cdot X_n]$.

3. Receiver according to claim 2, characterized in that the means for identifying the satellite of rank m comprise means for calculating a residue $DX = (|Z - H \cdot X|)^2$ for n different configurations with n−1 satellites each, each configuration corresponding to the exclusion of a determined satellite, means for each time comparing the residue with a threshold, means for identifying a satellite of rank m such that the residue is greater than the threshold for all the configurations in which this satellite is present and less than the threshold for the configuration in which it is absent.

4. Receiver according to claim 3, characterized in that the measurement vector is a position vector.

5. Receiver according to claim 3, characterized in that the measurement vector is a velocity vector.

6. Receiver according to claim 2, characterized in that the measurement vector is a position vector.

7. Receiver according to claim 2, characterized in that the measurement vector is a velocity vector.

8. Receiver according to one of claim 1, characterized in that the measurement vector is a position vector.

9. Receiver according to one of claim 1, characterized in that the measurement vector is a velocity vector.

* * * * *